(12) United States Patent
Manca

(10) Patent No.: US 11,079,889 B2
(45) Date of Patent: Aug. 3, 2021

(54) INPUT SENSING USING OVERLAPPING CODE DIVISION MULTIPLEXING (CDM)

(71) Applicant: Synaptics Incorporated, San Jose, CA (US)

(72) Inventor: Gian Mario Manca, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 15 days.

(21) Appl. No.: 16/591,503

(22) Filed: Oct. 2, 2019

(65) Prior Publication Data
US 2021/0103360 A1 Apr. 8, 2021

(51) Int. Cl.
*G06F 3/044* (2006.01)
*G06F 3/041* (2006.01)
*G06F 3/0354* (2013.01)

(52) U.S. Cl.
CPC ........ *G06F 3/0446* (2019.05); *G06F 3/03547* (2013.01); *G06F 3/0418* (2013.01); *G06F 3/04166* (2019.05)

(58) Field of Classification Search
CPC .............. G06F 3/0446; G06F 3/04166; G06F 3/03547; G06F 3/0418
See application file for complete search history.

(56) References Cited

U.S. PATENT DOCUMENTS

2016/0148034 A1* 5/2016 Kremin .............. G06K 9/00033 382/124
2019/0101999 A1 4/2019 Amer et al.

OTHER PUBLICATIONS

Extended European Search Report, dated Feb. 2, 2021, in EP Application No. 20199260.9 filed Sep. 30, 2020.

* cited by examiner

*Primary Examiner* — Peter D McLoone
(74) *Attorney, Agent, or Firm* — Leydig, Voit & Mayer, Ltd.

(57) ABSTRACT

Sensing systems and methods that utilize zero row sum code division multiplexing (CDM) drive matrices to reduce or eliminate radiative emissions. Measurements corresponding to an input received at a sensing region of the input device are obtained by driving a first subset of transmitters of the input device according to a first portion of a CDM drive matrix, wherein the CDM matrix is a zero row sum matrix, and obtaining first measurement signals with the plurality of receivers, and driving a second subset of the transmitters according to a second portion of the CDM drive matrix, wherein the first and second subsets of transmitters include at least one transmitter in common, and obtaining second measurement signals with the plurality of receivers. An image of the input may be generated based on the obtained measurements.

19 Claims, 17 Drawing Sheets

3: $\begin{bmatrix} 0 & -1 & 1 \\ 1 & 0 & -1 \\ -1 & 1 & 0 \end{bmatrix}$   $M^T = -M$ 5: $\begin{bmatrix} 0 & -1 & 1 & -1 & 1 \\ -1 & 0 & 1 & 1 & -1 \\ 1 & 1 & 0 & -1 & -1 \\ -1 & 1 & -1 & 0 & 1 \\ 1 & -1 & -1 & 1 & 0 \end{bmatrix}$   $M^T = +M$ 7: $\begin{bmatrix} 0 & 1 & -1 & -1 & 1 & -1 & 1 \\ -1 & 0 & 1 & 1 & -1 & -1 & 1 \\ 1 & -1 & 0 & 1 & 1 & 1 & -1 \\ 1 & -1 & -1 & 0 & 1 & 1 & 1 \\ -1 & 1 & -1 & -1 & 0 & 1 & -1 \\ 1 & 1 & -1 & -1 & -1 & 0 & 1 \\ -1 & -1 & 1 & -1 & 1 & -1 & 0 \end{bmatrix}$   $M^T = -M$

$$\begin{array}{c}
1 \left\{ \begin{bmatrix} -1 & -1 & 1 & 0 & 1 & 1 & -1 \\ 1 & 1 & -1 & -1 & 0 & 1 & -1 \\ -1 & 0 & -1 & 1 & -1 & 1 & 1 \\ 1 & -1 & 1 & -1 & -1 & 0 & 1 \\ -1 & 1 & 0 & -1 & 1 & -1 & 1 \\ 1 & -1 & -1 & 1 & 1 & -1 & 0 \\ 0 & 1 & 1 & 1 & -1 & -1 & -1 \end{bmatrix} \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{matrix} \right. \\[2em]
2 \left\{ \begin{matrix} 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{matrix} \begin{bmatrix} -1 & -1 & 1 & 0 & 1 & 1 & -1 \\ 1 & 1 & -1 & -1 & 0 & 1 & -1 \\ -1 & 0 & -1 & 1 & -1 & 1 & 1 \\ 1 & -1 & 1 & -1 & -1 & 0 & 1 \\ -1 & 1 & 0 & -1 & 1 & -1 & 1 \\ 1 & -1 & -1 & 1 & 1 & -1 & 0 \\ 0 & 1 & 1 & 1 & -1 & -1 & -1 \end{bmatrix} \begin{matrix} 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{matrix} \right. \\[2em]
3 \left\{ \begin{matrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{matrix} \begin{bmatrix} -1 & -1 & 1 & 0 & 1 & 1 & -1 \\ 1 & 1 & -1 & -1 & 0 & 1 & -1 \\ -1 & 0 & -1 & 1 & -1 & 1 & 1 \\ 1 & -1 & 1 & -1 & -1 & 0 & 1 \\ -1 & 1 & 0 & -1 & 1 & -1 & 1 \\ 1 & -1 & -1 & 1 & 1 & -1 & 0 \\ 0 & 1 & 1 & 1 & -1 & -1 & -1 \end{bmatrix} \right.
\end{array}$$

Transmitter number:
1  2  3  4  5  6  7  8  9  10  11  12  13  14  15

FIG. 6B circulant of dimension 7 (each row is just the previous row shifted by one):

```
-1 -1  0  1  1 -1  1
 1 -1 -1  0  1  1 -1
-1  1 -1 -1  0  1  1
 1 -1  1 -1 -1  0  1
 1  1 -1  1 -1 -1  0
 0  1  1 -1  1 -1 -1
-1  0  1  1 -1  1 -1
```

FIG. 6C even dimensions (8-dimensional example)

INPUT SENSING USING OVERLAPPING CODE DIVISION MULTIPLEXING (CDM)

TECHNICAL FIELD

The present disclosure generally provides systems and methods for input sensing using code division multiplexing (CDM).

BACKGROUND

Input devices, including touch sensor devices (also commonly called touchpads or proximity sensor devices), as well as fingerprint sensor devices, are widely used in a variety of electronic systems. Touch sensor devices typically include a sensing region, often demarked by a surface, in which the touch sensor device determines the presence, location, force, and/or motion of one or more input objects. Touch sensor devices may be used to allow a user to provide user input to interact with the electronic system. Fingerprint sensor devices also typically include a sensing region in which the fingerprint sensor device determines presence, location, motion, and/or features of a fingerprint or partial fingerprint. Finger print sensor devices may be used for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems such as opaque touchpads and fingerprint readers integrated in or peripheral to notebook or desktop computers. Touch sensor devices and fingerprint sensors are also often used in smaller computing systems such as touch screens integrated in mobile devices such as smartphones and tablets.

SUMMARY

According to an embodiment, a method of input sensing using an input device is provided. The method may include receiving, at a sensing region of the input device, an input, and obtaining, using a plurality of receivers of the input device, measurements corresponding to the input, wherein obtaining the measurements includes driving a first subset of transmitters of the input device according to a first portion of a CDM transmitter control, or drive, matrix, wherein the CDM matrix is a zero row sum matrix, and obtaining first measurements with the plurality of receivers, and driving a second subset of the transmitters according to a second portion of the CDM drive matrix, wherein the first and second subsets of transmitters include at least one transmitter in common, and obtaining second measurements with the plurality of receivers. The method may also include generating, by a processing system of the input device, an image of the input based on the obtained first and second measurements. The obtaining measurements may further include driving a third subset of the transmitters according to the CDM drive matrix, wherein the third subset of transmitters includes at least one transmitter in common with the first subset of transmitters or the second subset of transmitters, and obtaining third measurements with the plurality of receivers. The generating an image may include processing the first measurements, the second measurements and the third measurements.

According to another embodiment, an input device for sensing a biometric object is provided. The input device may include a surface corresponding to a sensing region, wherein the sensing region is configured to receive one or more inputs, e.g., one or more objects such as one or more fingers, transmitters configured to be driven with transmitter signals, and receivers configured to obtain measurement signals by driving a first subset of the transmitters according to a first portion of a CDM drive matrix, wherein the CDM matrix is a zero row sum matrix, and obtaining first measurement signals with the receivers, and thereafter driving a second subset of the transmitters according to a second portion of the CDM drive matrix, wherein the first and second subsets of transmitters include at least one transmitter in common, and obtaining second measurement signals with the receivers. The input device may also include a processing system, configured to generate an image of the one or more inputs based on the obtained measurement signals.

According to yet another embodiment, a non-transitory computer-readable medium having processor-executable instructions stored thereon is provided. The processor-executable instructions include instructions for performing input sensing using an input device. The processor-executable instructions, when executed by a processing system, enable the processing system to implement a method which includes obtaining, via receivers of the input device, measurement signals corresponding to one or more inputs received at a sensing region of the input device by driving a first subset of transmitters of the input device according to a first portion of a CDM drive matrix, wherein the CDM matrix is a zero row sum matrix, and obtaining first measurement signals with the receivers, and driving a second subset of the transmitters according to a second portion of the CDM drive matrix, wherein the first and second subsets of transmitters include at least one transmitter in common, and obtaining second measurement signals with the receivers. The processor-executable instructions also enable the processing system to generate an image of the one or more inputs by processing the first measurement signals and the second measurement signals.

In certain aspects, all driving and measurement iterations for a first subset of transmitters are performed before any driving and measurement iterations for a second subset of transmitters are performed.

According to a further embodiment, a method of operating an input device having a plurality of receivers and a plurality of transmitters is provided. The method may include receiving, at a sensing region of the input device, one or more inputs, driving the plurality of transmitters, and obtaining measurement signals using the plurality of transmitters while the transmitters are being driven. The obtaining measurement signals may include obtaining, using a first subset of the plurality of receivers of the input device, first measurement signals corresponding to the input, and thereafter obtaining, using a second subset of the plurality of receivers of the input device, second measurement signals corresponding to the input, wherein the second subset includes at least one receiver in common with the first subset. The method may further include determining a difference between the first measurement signals and the second measurement signals corresponding to the at least one receiver in common, and adjusting one of the first measurement signals or the second measurement signals based on the determined difference, e.g., to thereby remove a difference in noise detected between the first and second measurement signals.

Reference to the remaining portions of the specification, including the drawings and claims, will realize other features and advantages of the present invention. Further features

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

FIG. 5 illustrates examples of odd dimension matrices, according to one or more embodiments.

FIG. 6B shows an example of a CDM matrix including 3 overlapping CDM7 matrices of FIG. 6A, according to one or more embodiments.

FIG. 6C shows an example of a circulant matrix of dimension 7, according to one or more embodiments.

FIG. 6D shows an example of an even dimension CDM 8 matrix, according to one or more embodiments.

FIG. 7 shows a full inverse (21×21) matrix for the matrix of FIG. 6B, according to one or more embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In one or more embodiments, input devices, including touch sensor devices and fingerprint sensor devices, utilize code division multiplexing (CDM) with respect to transmitter signals driven onto transmitter electrodes, in order to enhance the signal level. In some embodiments, the CDM order, corresponding to the amount of transmitters being simultaneously driven, is equivalent to the total number of transmitter electrodes such that all transmitter electrodes are simultaneously driven for a plurality of imaging or sensing iterations. In some embodiments, lower-order CDM may be used wherein a fewer number of transmitter electrodes are simultaneously driven. For example, separate portions or blocks of a larger CDM drive matrix may be used to drive separate or overlapping portions of the transmitter electrodes at different times. Lower-order CDM provide for various advantages including reduction in peak power, reduction in average power, reduction in sensor self-heating, and reduction in computational complexity. These advantages may be achieved in a flexibly configurable manner to meet the desired power specifications for various implementations of touch sensor devices and fingerprint sensor devices.

Figure 1:
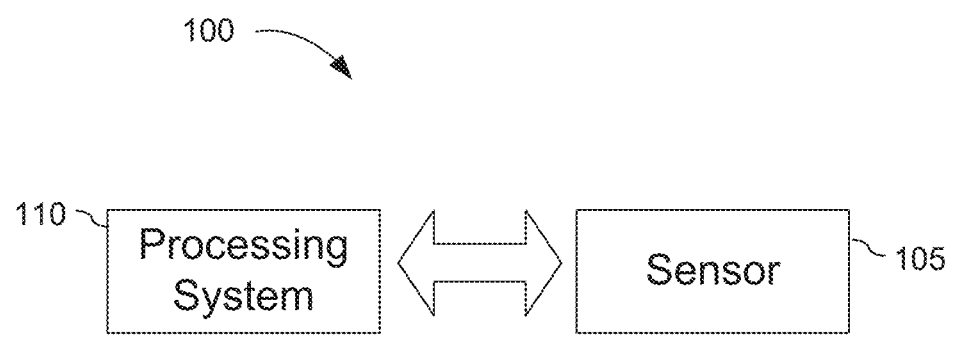
FIG. 1 is a block diagram depicting an example input device, according to one or more embodiments.

FIG. 1 is a block diagram depicting an example input device 100 according to one or more embodiments. The input device 100 may be configured to provide input to an electronic system (not shown for simplicity). As used in this document, the term "electronic system" or "electronic device" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system or device may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I²C), Serial Peripheral Interface (SPI), Personal System/2 (PS/2), Universal Serial Bus (USB), Bluetooth®, radio frequency (RF), and Infrared Data Association (IrDA).

In one or more embodiments, the input device 100 comprises one or more sensing elements for detecting user input. The input device 100 may include a sensor 105, which comprises one or more sensing elements configured to sense input provided by one or more input objects in a sensing region. Examples of input objects include fingers, styli, and hands. The sensing region may encompass any space above, around, in and/or near the sensor 105 in which the input device 100 is able to detect user input (e.g., user input provided by one or more input objects). The size, shape, and/or location of the sensing region may vary from embodiment to embodiment and depending on actual implementations. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary with the type of sensing technology used and/or the accuracy desired. Thus, some embodiments sense input that comprises no physical contact with any surfaces of the input device 100, contact with an input surface (e.g., a touch surface and/or screen) of the input device 100, contact with an input surface of the input device 100 coupled with some amount of applied force or pressure, or a combination thereof. In various embodiments, input surfaces may be provided by surfaces of sensor substrates within which or on which sensor elements are positioned, or by face sheets or other cover layers positioned over sensor elements. In various embodiments, input surfaces may be provided by one or more surfaces of a casing or a housing of the input device 100.

The input device 100 may utilize various sensing technologies to detect user input in the sensing region. Example sensing technologies capacitive, elastive, resistive, inductive, magnetic, acoustic, ultrasonic, and/or optical techniques. In some embodiments, the input device 100 may utilize capacitive sensing technologies to detect user inputs. For example, a sensing region may include one or more capacitive sensing elements (e.g., sensor electrodes) to create an electric field by the applied voltage and/or current. The input device 100 may detect inputs based on changes in capacitance of the sensing elements. For example, an object in contact with (or close proximity to) the electric field may cause changes in the voltage and/or current in the sensing elements. Such changes may be detected as "signals" indicative of user input. The sensing elements may be arranged in arrays, or other regular or irregular patterns, or other configurations to detect inputs at multiple points within the sensing region. In some implementations, separate sensing elements may be ohmically shorted together to form larger sensor electrodes. Some other implementations may utilize resistive sheets, which may be uniformly resistive.

Some capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between one or more sensing elements and a substantially grounded touching object or object in proximity. For example, an input object near one or more sensing elements may alter the electric field near the sensing elements, thus changing the measured capacitive coupling between two or more sensor electrodes of the sensing elements. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance (or transcapacitive or trans-capacitive) sensing methods detect changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effects corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including, e.g., ridge endings and bifurcations), orientation fields (sometimes referred to as "ridge flows"), and/or ridge skeletons. These are sometimes referred to as level 1 and level 2 features, and in an embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. The placement sensor may include a two dimensional array of sensing elements capable of capturing a desired area of the fingerprint in a single frame. In a swipe sensor implementation, the sensor is configured to capture to a fingerprint input based on relative movement between the user's finger and the sensing region. The swipe sensor may include a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 mm$^2$ or less. In another example embodiment, a partial placement sensor has an imaging area in the range of 20-50 mm$^2$. In some implementations, the partial fingerprint sensor has an input surface that is the same size the imaging area.

Referring back to FIG. 1 according to one or more embodiments, the input device 100 includes a processing system 110 as shown. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter electrodes of the sensor 105, and/or receive resulting signals detected via receiver electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solid materials, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
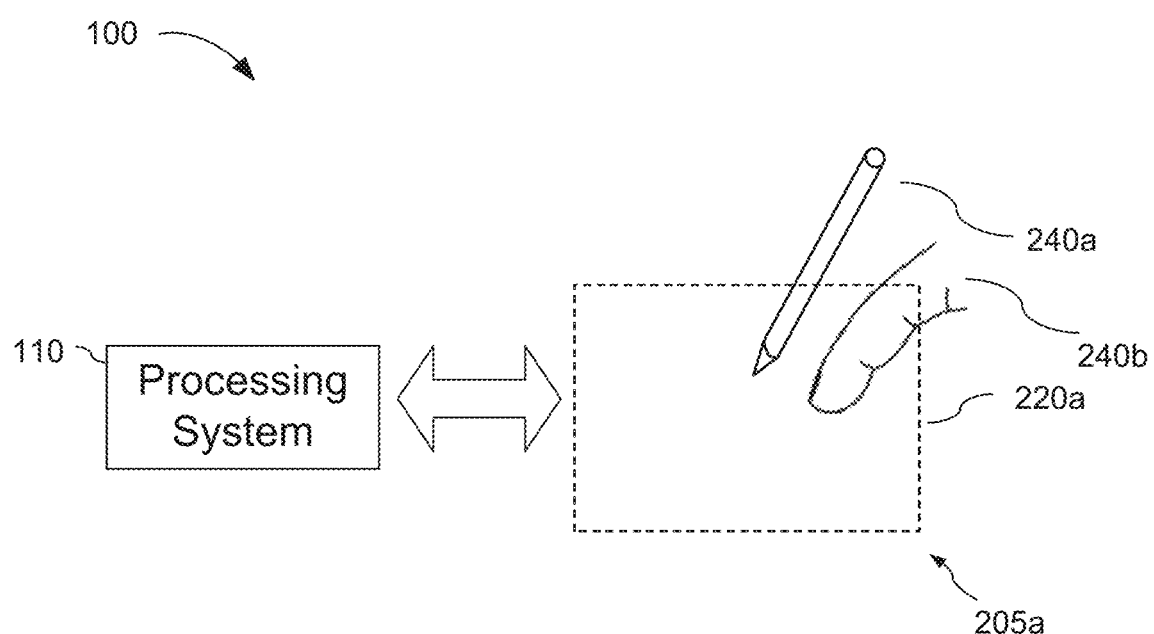
FIGS. 2A-2B are block diagrams depicting further example input devices, according to some embodiments.
Figure 2B:
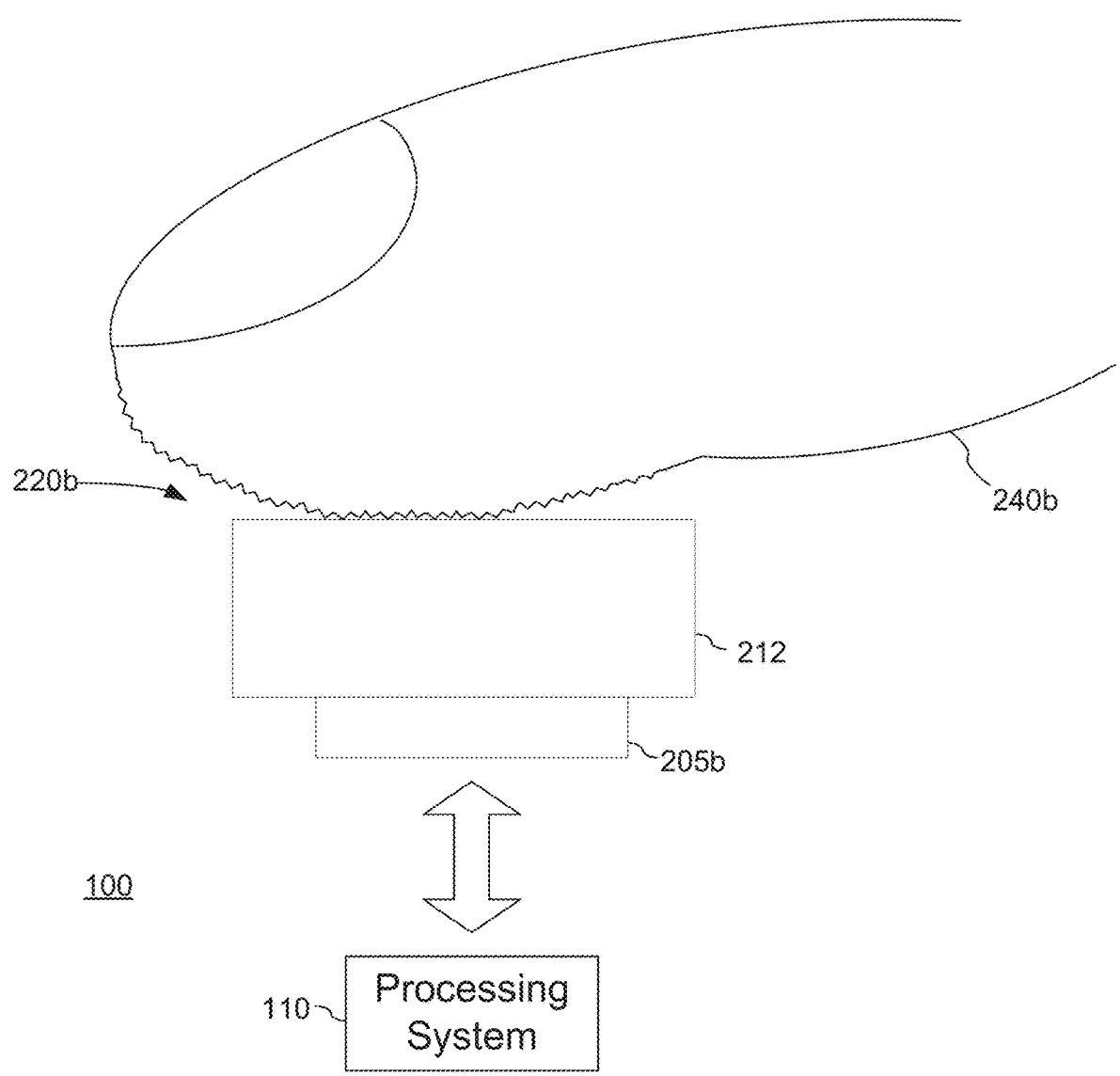

FIGS. 2A-2B are block diagrams depicting further input devices according to some embodiments. In FIG. 2A, the input device 100 is shown as including a touch sensor 205a. The touch sensor 205a is configured to detect position information of an input object within the sensing region 220a, according to an embodiment. The input object may include a finger 240b or a stylus 240a, as shown in FIG. 2A. The sensing region 220a may include an input surface having a larger area than the input object. The touch sensor 205a may include an array of sensing elements with a resolution configured to detect a location of a touch to the input surface. The input device 100 may also be configured to detect presence, force, and/or motion of an input object with the touch sensor 205a. The input object may include more than one object.

In FIG. 2B, the input device 100 is shown as including a fingerprint sensor 205b. The fingerprint sensor 205b is configured to capture a fingerprint from a finger 240b. In one embodiment, the fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b may have an array of sensing elements with a resolution configured to detect surface variations of the finger 240b, and the fingerprint sensor 205b has a higher resolution than the touch sensor 205a of FIG. 2A.

Figure 3:
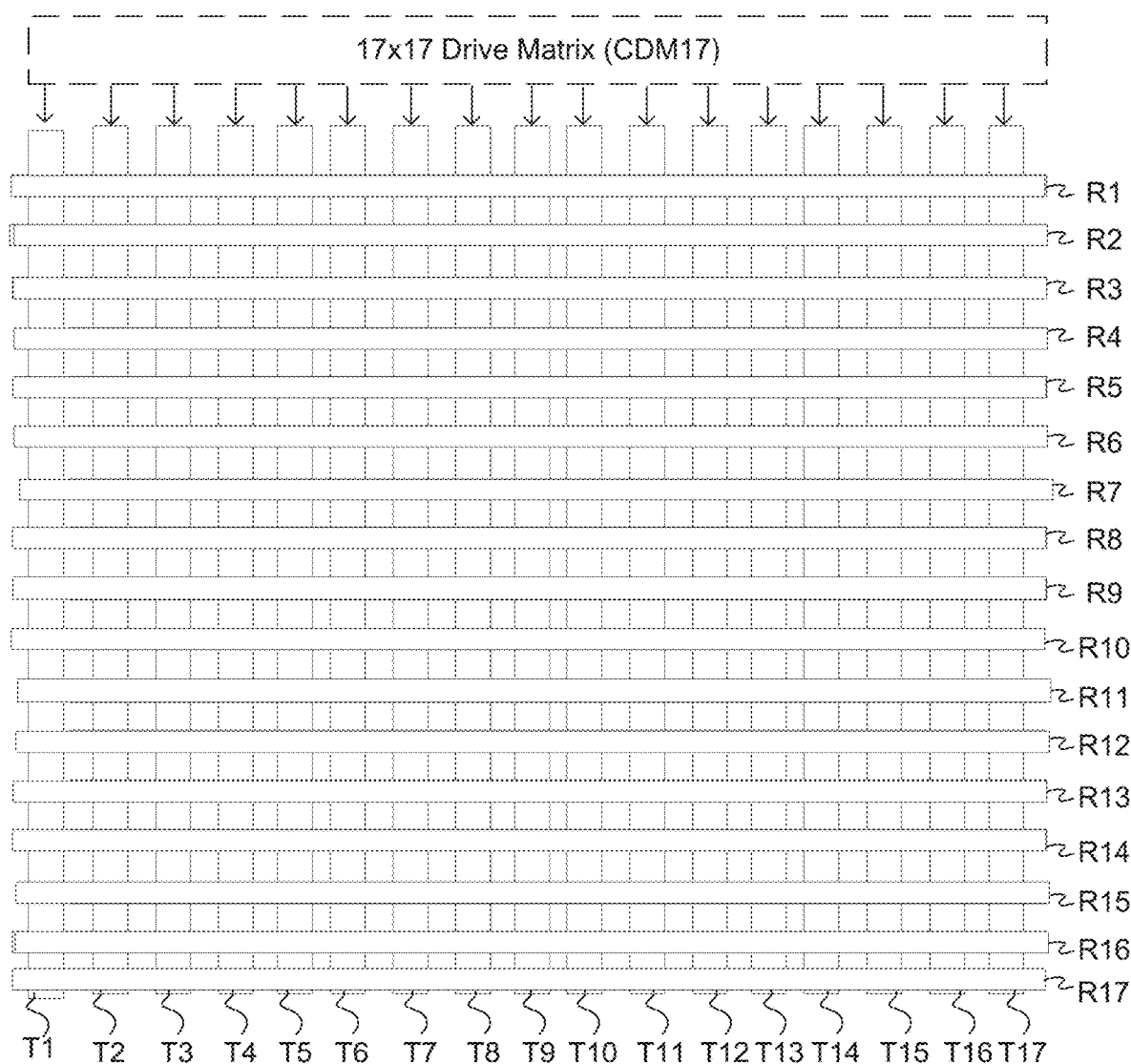
FIG. 3 depicts an orthogonal grid of transmitter electrodes and receiver electrodes of an input device according to one or more embodiments.

FIG. 3 depicts an orthogonal 17×17 grid of transmitter electrodes, T1-T17, and receiver electrodes, R1-R17, of an example input device according to one or more embodiments. In FIG. 3, the input device is being driven by a 17×17 drive matrix. It will be appreciated that a 17×17 grid is shown for illustrative purposes, but that various implementations of an input device may be of any size, having even or odd numbers of electrodes—including, for example, 15×15, 15×27, 17×17, 17×27, 31×31, 16×16, 22×22, 56×96, 80×80, 88×116, 56×144, 72×80, and other electrode grid sizes. It will further be appreciated that although a grid with transmitter electrodes and receiver electrodes orthogonal to one another in a bars and stripes configuration is used herein as an example, other example implementations of a capacitive input device may utilize other configurations of transmitter electrodes and receiver electrodes—including, for example, single-layer configurations with interdigitated electrodes, matrix configurations where each pixel corresponds to an electrode plate, orthogonal diamond configurations, etc. It will be appreciated that although the illustrative example discussed in this embodiment is provided in the context of a capacitive input device, the principles described in this embodiment and others may also be applied to other types of input devices, such as acoustic or ultrasonic input devices, or other device that also utilizes transmitters and receivers.

As shown in FIG. 3, the transmitter electrodes T1-T17 may be driven according to various CDM driving techniques or schemes. For example, in one CDM driving scheme, where the CDM order is 17 (CDM17), all transmitter electrodes T1-T17 are simultaneously driven with different codings, with each row of the CDM drive matrix each having a same row sum, over 17 imaging iterations (corresponding to a 17×17 drive matrix). Thus, with all of transmitter electrodes T1-T17 being driven 17 times, this would result in relatively high peak power, average power, sensor self-heating, and computational complexity. The information captured through the CDM technique is then deconvolved or decoded using the inverse (for a non-zero row sum drive matrix) or transpose (for a zero row sum drive matrix) of the drive matrix to obtain an image corresponding to an input.

Certain sensor applications, such as in automotive subsystems, may have a very stringent set of electromagnetic radiation emission requirements they may not exceed; one such standard is CISPR25 [*Comité International Spécial des Perturbations Radioélectriques*, English: International Special Committee on Radio Interference]. The CISPR25 standard includes emission limits versus frequency and has three measurement limits versus frequency as measured on a spectrum analyzer: peak, quasi-peak and average. In some embodiments, a capacitive touch sensing system used in a vehicle may inherently radiate because the touch sensing system detects a finger by changing voltages on the sensor electrodes and measuring changes in capacitance on those electrodes. Every electrode may become an antenna and may emit radiation. When CDM schemes are introduced to increase the signal-to-noise ratio, the radiated emissions may further increase according to the row sum of the transmitter control/driving CDM matrix.

Figure 4A:
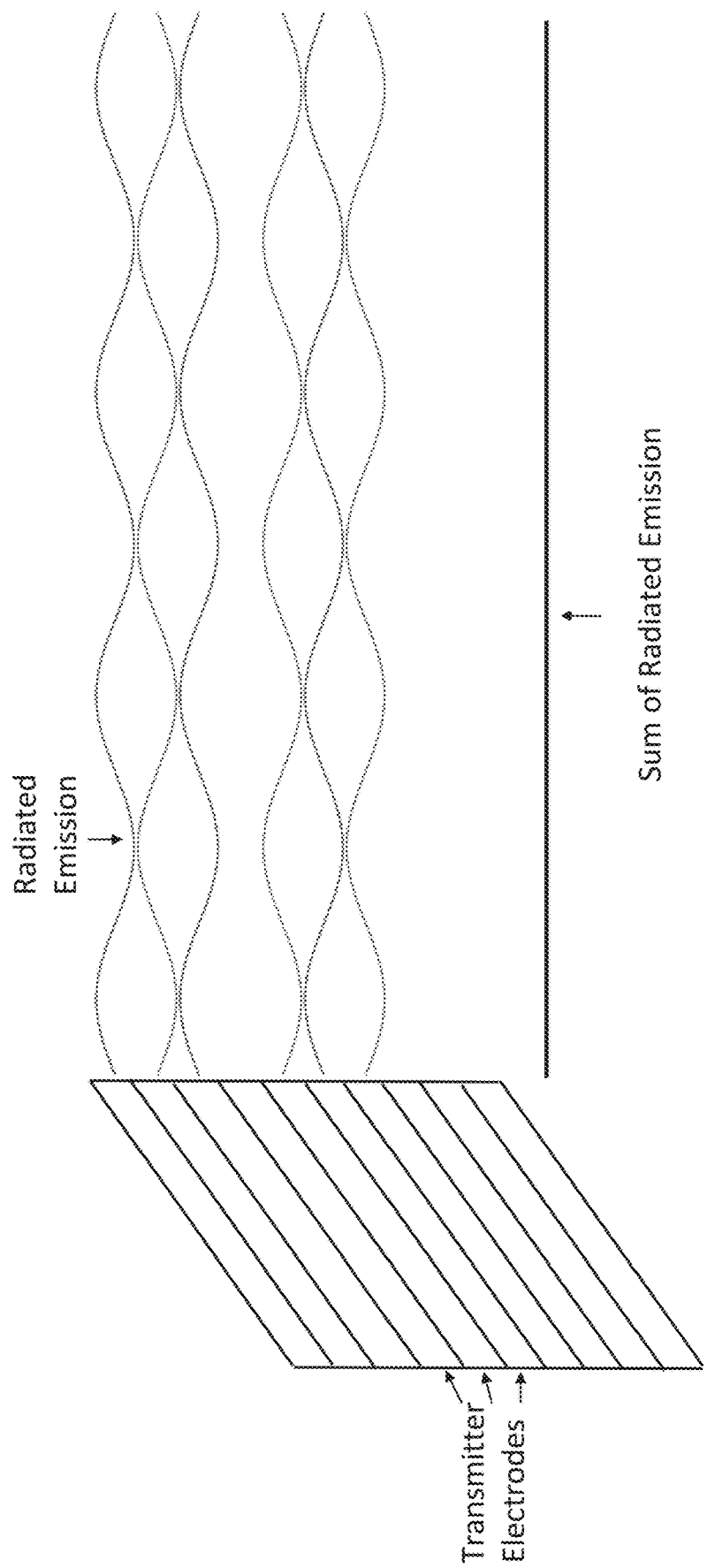
FIG. 4A illustrates an example of zero row sum CDM for radiated emission mitigation, according to one or more embodiments.
Figure 4B:
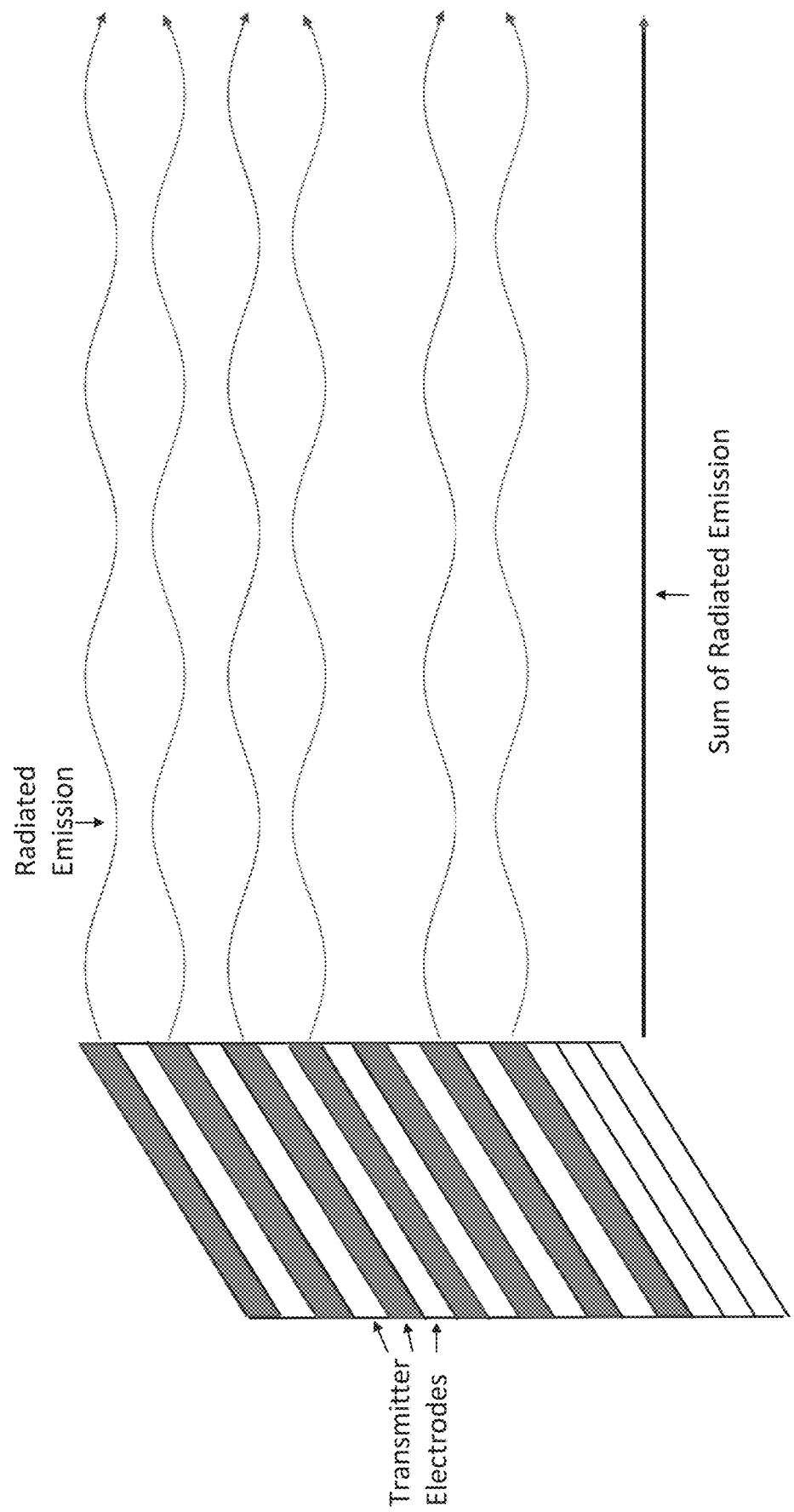
FIG. 4B illustrates an example of interleaved zero row sum CDM for radiated emission mitigation, according to one or more embodiments.

In an embodiment, zero row sum drive matrices are used to drive sensor electrodes to allow deconvolution of the raw measurements to recover the original signals on each electrode to within an arbitrary constant, which can be conveniently set to provide a zero amplitude baseline in a 2D image. Zero row sum matrices have the desirable property that the sum of the emissions from the active (driven) set of transmitter electrodes ("transmitters") in the CDM drive pattern sum to zero, which means the emitted radiation from half of the active transmitters radiate or couple 180° out of phase with the other half of the active transmitters and the net radiated emission is zero or negligible as shown in FIG. 4A and FIG. 4B. FIG. 4A shows an example of zero row sum CDM radiated emissions. In particular, a single drive iteration is shown using a zero row sum CDM7 matrix to drive a contiguous subset of 7 transmitter electrodes (top 7 transmitter electrodes in FIG. 4A). Note that the middle ($4^{th}$) electrode of the 7 driven electrodes is not transmitting (0) for the particular drive iteration shown. FIG. 4B shows an example of interleaved zero row sum CDM using a CDM7 matrix to drive non-contiguous transmitter electrodes as will be discussed in more detail below. In the specific interleaved drive iteration shown in FIG. 4B, every other transmitter electrode is driven using CDM7, wherein the non-driven transmitter electrode ($9^{th}$ from top in example shown) may be driven in a subsequent CDM drive iteration.

A certain class of matrices have the elegant property, namely $$\vec{M}^T\vec{M} = d\vec{I} - \overrightarrow{\text{Ones}}.$$

That is, driving a 2-dimensional (2D) transcapacitive image sensor with a suitable matrix, M, then deconvolving the acquired data with the transpose of that matrix yields the dimension of the matrix times the transmitter's row data minus the average of all the rows' data in the CDM set. This recognition increases flexibility for driving sensors having odd numbers of transmitters.

Lowering radiated emissions may be useful for simultaneously performing touch sensing and meeting automotive radiated emission specifications/standards. When using square wave waveforms, there may be an infinite number of harmonics and many may fall within frequency bands where radiated emission limits exist. Using Zero Row Sum driving matrices reduce those harmonics as well. Even using sine wave sensing, reducing the emissions at that single frequency may still be needed depending on particular requirements and possible future modifications to the international specifications.

In certain embodiments, CDM drive matrices M have the three properties:
1. The matrix elements are from the set {−1, 0, +1};
2. The sum of each row is zero, i.e., $\Sigma_j M_{ij}=0$; and
3. The transpose of M times M has the relationship:

$$\frac{M^T \cdot M}{d} = I - \frac{\begin{bmatrix} 1 & \cdots & 1 \\ \vdots & \ddots & \vdots \\ 1 & \cdots & 1 \end{bmatrix}}{d} == I - 1 \cdot \frac{1}{d}\sum_i pixels_i == I - 1 \cdot \langle pixels_i \rangle \quad (\text{Eq. 1})$$

where d is the dimension of the CDM matrix M and $\langle pixel_i \rangle$ is the average of the pixels within a CDM group or block.

Examples of CDM drive matrices of dimension 3, 5 and 7 are shown in FIG. 5. These odd zero row sum matrices furthermore possess the property that the transpose of M is plus or minus the matrix M according to the dimension d, i.e., if (d−1)/2 is even then $M^T=M$, if (d−1)/2 is odd $M^T=-M$.

If the right hand side of Eq. 1 is averaged over the pixels (the i index) it is identically 0. That property implies that each CDM block's resulting values average (and sum) to zero, so if multiple CDM blocks are required for a larger sensor, the complete deconvolved profile of an object touching the sensor may have discontinuities. Also, after deconvolution, each column of the CDM block has zero mean, so there is 1 free parameter per CDM block, per receiver, to be determined to reconstruct the original image. As an example, for 3 CDM blocks and 27 physical receivers there will be 3×27=81 free parameters to be determined. Additionally, in situations where the transmitters of small CDM blocks are covered with two or more objects (e.g., fingers), it may be difficult to determine the original signal and to reconstruct or recover the original image in various situations. Therefore, it is desirable to reduce the number of free parameters to be determined.

According to certain embodiments, multiple overlapping CDM blocks are used, wherein multiple overlapping CDM blocks are "stitched" together to form a larger CDM drive matrix. Such embodiments advantageously reduce the number of free parameters to be determined, improves efficiency of the reconstruction of the original images detected, and preserves the benefits of Zero Row Sum CDM while reducing or eliminating negative side-effects of artifacts such as baseline errors and Low Ground Mass (LGM) effects, improving large object discrimination, display noise removal, etc. LGM effects may show up as a deformation of large object signals or the presence of spurious negative signals at the intersection between touched receivers and transmitters, as examples.

For example, in an embodiment, each constituent CDM block making up the larger CDM block overlaps with at least one other constituent CDM block; that is, each constituent CDM block drives at least one transmitter in common with another constituent CDM block. In an embodiment, any number of constituent CDM blocks may be used, wherein each constituent CDM block has at least one (driven) transmitter in common with one of the other constituent CDM blocks.

According to an embodiment, a method of input sensing using an input device driven with such a zero row sum CDM matrix may include receiving, at a sensing region of the input device, an input, and obtaining, using a plurality of receivers of the input device, measurements corresponding to the input, wherein obtaining the measurement signals includes driving a first subset of transmitters of the input device according to a first portion of a CDM drive matrix and obtaining first measurement signals with the plurality of receivers, and driving a second subset of the transmitters according to a second portion of the CDM drive matrix, wherein the first and second subsets of transmitters include at least one transmitter in common, and obtaining second measurement signals with the plurality of receivers. In certain aspects, during each driving step or iteration, the measurement signals obtained or acquired by the plurality of receivers are simultaneously obtained or acquired with the driving of the corresponding subset of transmitters.

Figure 6A:
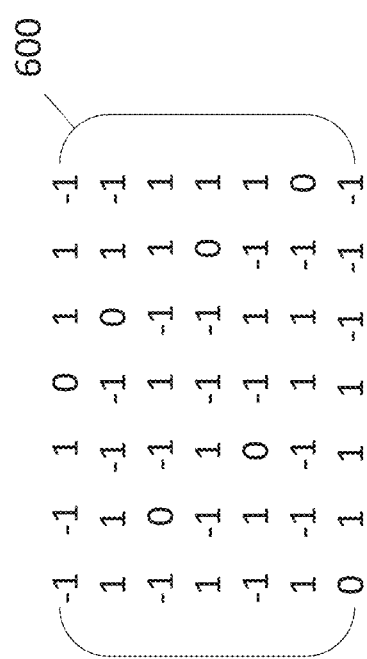
FIG. 6A shows an example of an of odd dimension CDM7 matrix, according to one or more embodiments.

As an example, FIG. 6A shows an example of a Zero Row Sum CDM7 block 600, and FIG. 6B shows an example of a 15×21 CDM transmitter control matrix (or drive matrix) 610 including three overlapping CDM7 blocks 600 of FIG. 6A (identified in FIG. 6B as blocks 1, 2 and 3) on a touch sensor including 15 transmitter rows. Consecutive rows of the drive matrix represent consecutive drive iterations or periods in time, and the columns indicate the polarity (+1 and −1) or not transmitting (0) for each transmitter. The touch sensor may include any number of receiver rows, for example 17 receiver rows (15×17) or 21 receiver rows (15×21) or 27 receiver rows (15×27), etc. As shown in FIG. 6B, constituent CDM blocks 1 and 2 overlap at transmitter electrodes 5, 6 and 7, and constituent CDM blocks 2 and 3 overlap at transmitter electrodes 9, 10 and 11. It should be appreciated that the blocks may overlap at different transmitters, or overlap with fewer or more transmitters and can be applied to any permutation of columns or rows.

In certain embodiments, other types of matrices may be used, for example circulant matrices and even dimension matrices, with the same CDM drive matrix properties described above. For example, a zero row sum CDM drive matrix may include a circulant matrix, an odd dimension matrix or an even dimension matrix. FIG. 6C shows an example of a circulant matrix of dimension 7, according to one or more embodiments. FIG. 6D shows an example of an even dimension CDM 8 matrix, according to one or more embodiments.

Advantages of driving electrodes using CDM matrices include an increase in the Signal-to-Noise Ratio (SNR) by roughly the square root of the CDM order, e.g., sqrt7 improvement for CDM7. The advantages of using zero row sum CDM matrices also includes a reduction in radiated emissions, especially when used in the context of transcapacitive touch sensing. According to certain embodiments, a higher order CDM matrix may be used so that it spans a larger distance and/or a smaller CDM matrix may be spread out to span a larger distance, e.g., driving non-contiguous transmitters in an interleaved manner such as every other transmitter driven for the span of the CDM matrix or every third transmitter driven for the span of the CDM matrix, etc.

Figure 8:
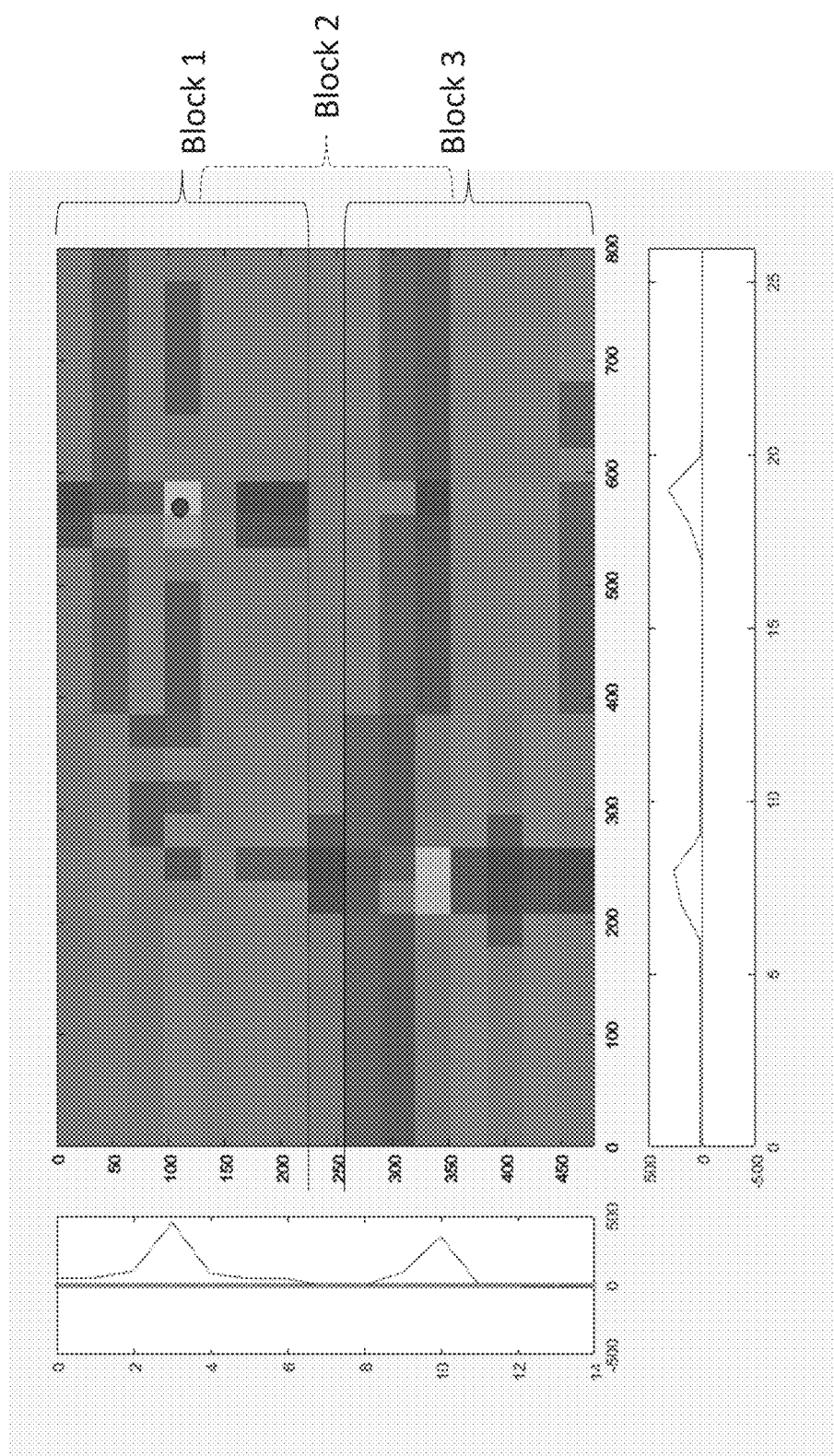
FIG. 8 shows an example of deconvolved image data for two fingers touching the input device screen with a zero row sum CDM7 in the presence of display noise, according to an embodiment.

Certain embodiments and advantages are now illustrated with figures. FIG. 8 shows an example of a deconvolved transcapacitive sensing image data acquired with the CDM drive matrix 610 of FIG. 6B (including three overlapping CDM7 matrices) with two fingers on a touch sensor having 15 transmitter rows and 27 receiver columns), according to one or more embodiments. In an embodiment with 27 receivers, the 3 deconvolved CDM blocks of the 2D image are obtained by applying:

Trans=(obj.cdmMatrixInvFull*transConvolved)/
obj.cdmOrder;

which in this example embodiment is a matrix operation of the type:

(matrix 21×27)=(matrix 21×21)*(matrix 21×27)/
cmdOrder, with cdmOrder=7.

Figure 7:
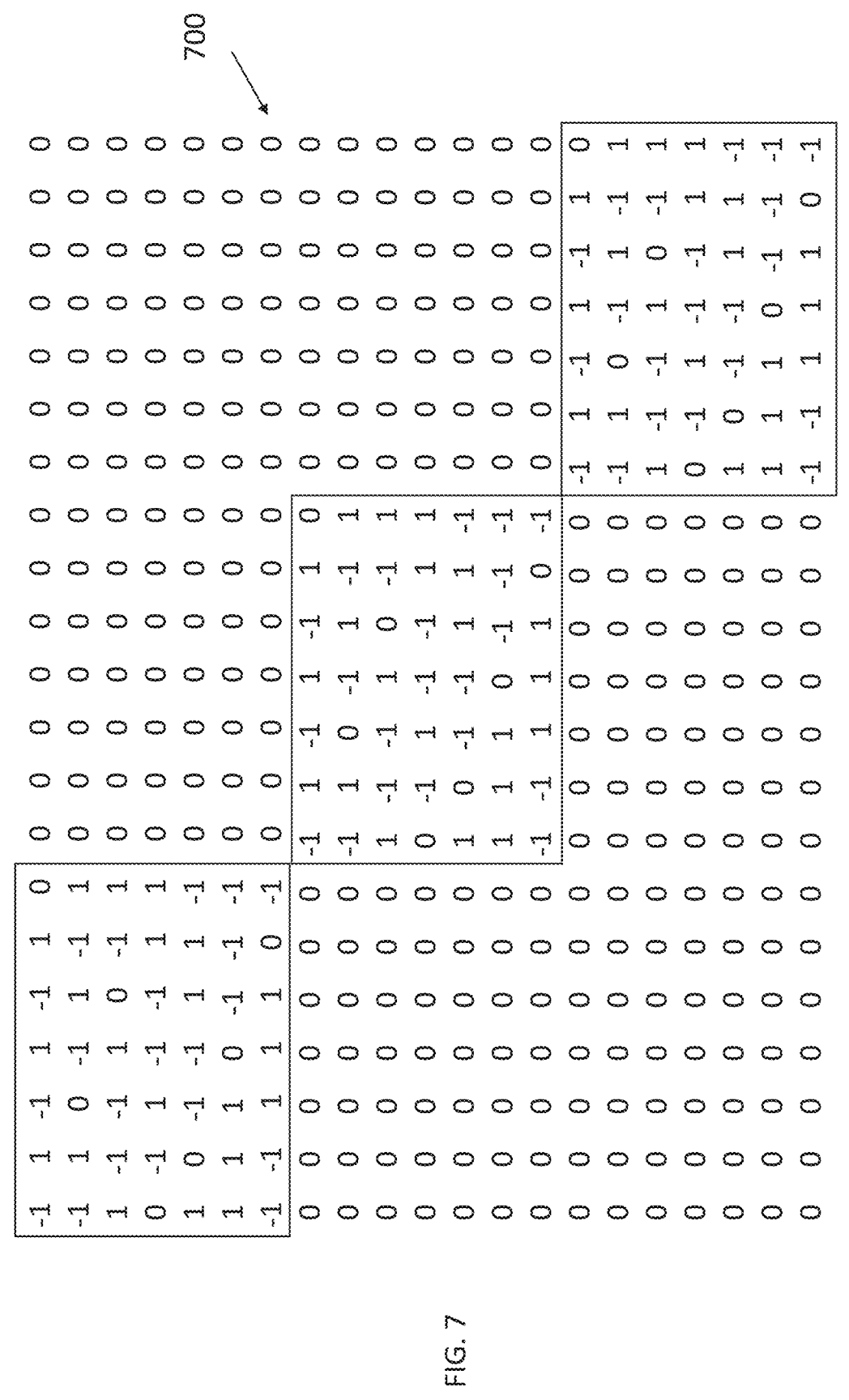

FIG. 7 illustrates the full inverse matrix 700 (cdmMatrixInvFull) of the CDM drive matrix 610 shown in FIG. 6B, and the 21×27 transConvolved matrix corresponds to the measurements acquired by the 27 receiver electrodes over the 21 transmitter driving iterations of the CDM drive matrix (i.e., each row of the CDM drive matrix 610 corresponds to a drive iteration where all (active) receiver electrodes may sense a signal simultaneously). The peaks reflect the shape and position of the fingers and subsequent Image Frame Processing (IFP) may be used to classify and process the image to obtain image information as desired. In an embodiment, a stitching and recombination procedure may be performed to obtain the full image. For example, stitching together and recombining the CDM blocks may be performed to obtain a single column of data per physical receiver. In the particular example being used, stitching and recombination may be performed to obtain the 15×27 image (corresponding to 15 transmitter electrodes and 27 receiver electrodes in this example). In one particular embodiment, the stitching and recombination may be accomplished (in Matlab® notation) for this particular example as follows:

% matching/stitching
   % compute the difference of the data on the same physical transmitter
   % shared between block 1 and block 2 dd1=trans(6,:)-trans(9,:); (% index (6, 9) correspond to time of measurement)
dd2=trans(7,:)-trans(10,:);
dd3=trans(5,:)-trans(8,:);
dd=(dd1+dd2+dd3)/3; % get an average
% shift the entire block 1
trans(1:7,:)=trans(1:7,:)-repmat(dd,7,1);
% compute the difference of the data on the same physical transmitter
% shared between block 2 and block 3
dd1=trans(13,:)-trans(16,:);
dd2=trans(12,:)-trans(15,:);
dd3=trans(14,:)-trans(17,:);
dd=(dd1+dd2+dd3)/3;
% shift the entire block 3
trans(15:21,:)=trans(15:21,:)+repmat(dd,7,1);
% recombining the 21×27 into a final 15×27 removing redundant data
trans=[trans(1:7,:); trans(11,:); trans(end-6:end,:)];
% this recombination may be done in different ways,
% to end up with a column of data per receiver.

Figure 9:
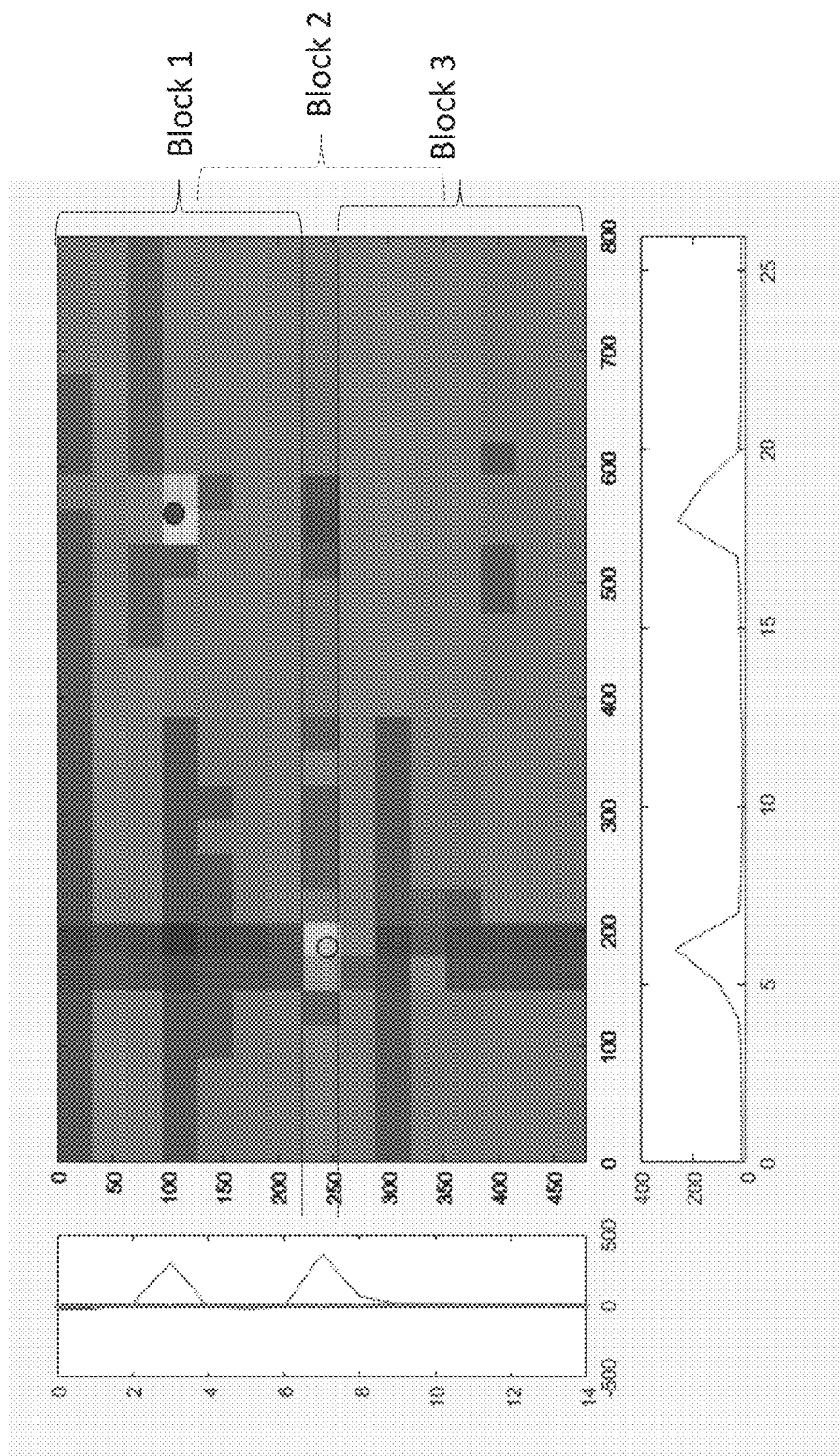
FIG. 9 shows an example of the deconvolved image data (FIG. 8) for two fingers touching the input device screen with a zero row sum CDM7 in the presence of display noise after undergoing a stitching and recombination process, according to an embodiment.

FIG. 9 shows an example of the deconvolved image data (of FIG. 8) for two fingers touching the input device screen with the zero row sum CDM7 drive matrix 610 in the presence of display noise after undergoing a stitching and recombination process, according to an embodiment. As can be seen, after stitching, in FIG. 9, an entire "touched" column/receiver moves with a single common mode zero-row-sum CDM artifact or noise, and the CDM blocks are no longer independent. For the particular "stitching" used in this example, the shift in the column is the average of the data on a column of CDM block 2. It should be noted that the finger on the left is touching the second CDM block, but the finger on the right is not, so there is no shift on the right side.

Figure 10:
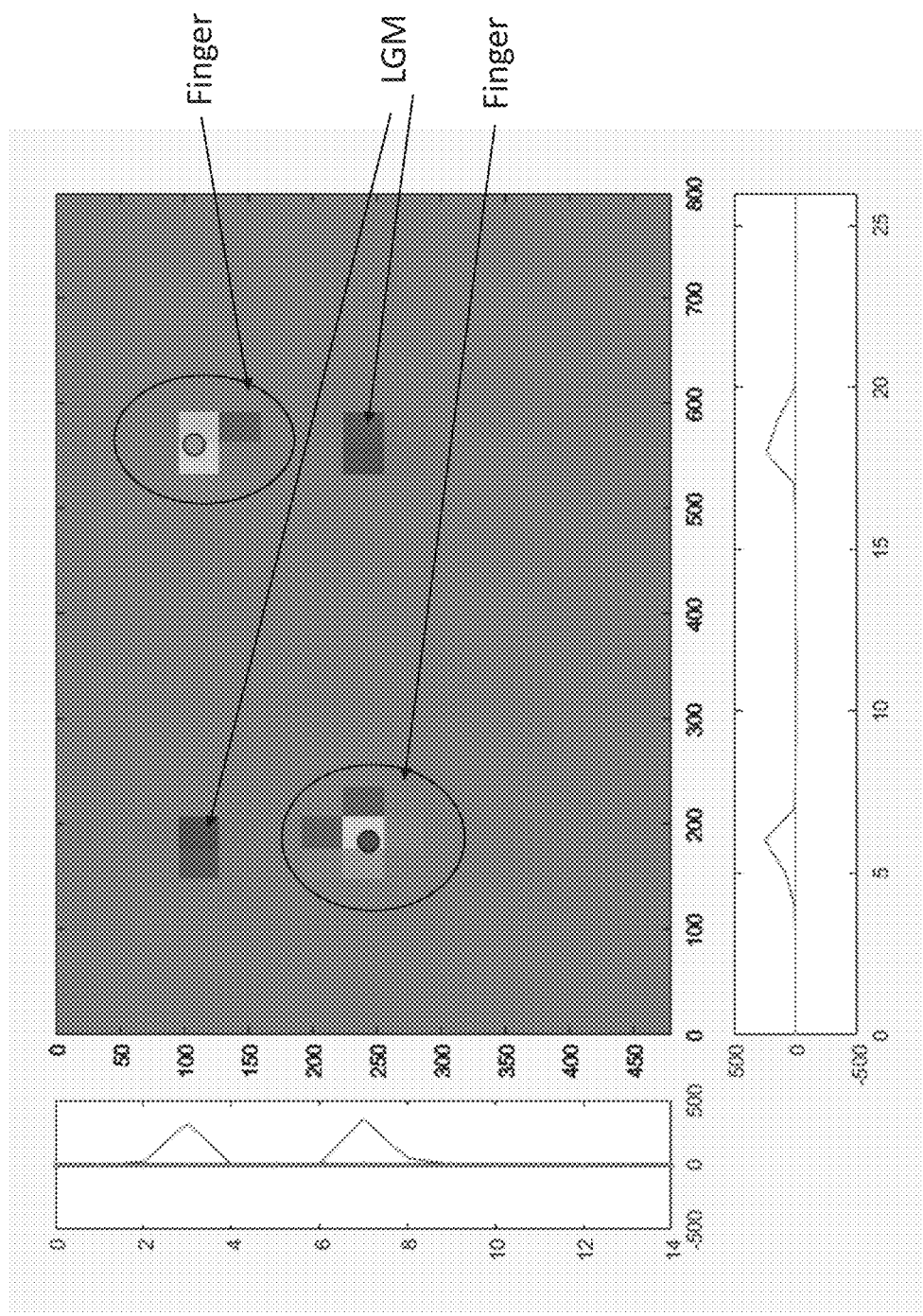
FIG. 10 shows an example of the deconvolved image data (FIG. 9) for two fingers touching the input device screen with a zero row sum CDM7 in the presence of display noise after undergoing a stitching and recombination process and after removing common mode noise and artifacts, according to an embodiment.

Image processing algorithms, e.g., to remove common-mode artifacts/noise and clean up the entire image, may be performed. FIG. 10 shows an example of the deconvolved image data (of FIG. 9) for two fingers touching the input device screen with a zero row sum CDM7 in the presence of display noise after undergoing a stitching and recombination process and after removing common mode noise and artifacts, according to an embodiment. In FIG. 10, the fingers, the LGM artifacts, etc., are clearly distinct. IFP processing algorithms may be performed (e.g., to correct LGM if necessary, classify objects, etc.) as desired, so that IFP may classify and report the two peaks as two fingers in this example.

A mathematical analysis of stitching, according to an embodiment, is provided below.

As an example, consider 2 zero-row-sum CDM blocks A and B of order N. The measured data per transmitter, after deconvolution, is:

$$\vec{A}^{(i)} = \vec{s}^{(i)} - \frac{1}{N}\sum_{j=1}^{N} \vec{s}^{(j)} + \alpha \vec{W}$$

$$\vec{B}^{(i)} = \vec{t}^{(i)} - \frac{1}{N}\sum_{j=1}^{N} \vec{t}^{(j)} + \beta \vec{W}$$

where, "i" is the transmitter index within the CDM block, s and t represent the physical "finger" capacitance, W the display noise weights and $\alpha$ and $\beta$ random variables. The averages are averages within the CDM block. Notice that for brevity any linear combination of weights is automatically replaced with a single weight vector multiplied by a new random variable, which is the linear combination of the previous random variables, i.e.:

$$\alpha \vec{W} + \beta \vec{W} = (\alpha+\beta)\vec{W} = \gamma \vec{W}$$

It should be noted that the distribution of $\gamma$ is different from the distribution of $\alpha$ and $\beta$, but the weights are the same, i.e. the vector space describing the display noise is not exited. Now, a name is given to the averages for compactness:

$$\vec{\bar{B}} = \frac{1}{N}\sum_{i=1}^{N} \vec{t}^{(j)}$$

$$\vec{\bar{A}} = \frac{1}{N}\sum_{i=1}^{N} \vec{s}^{(j)}$$

The reported data after CDM deconvolution may be represented as:

$$\vec{B}^{(i)} = \vec{t}^{(i)} - \vec{\bar{B}} + \beta \vec{W}$$

$$\vec{A}^{(i)} = \vec{s}^{(i)} - \vec{\bar{A}} + \beta \vec{W}$$

If there is a transmitter shared between the 2 CDM blocks and the difference of the reported data for that same transmitter present in the 2 different CDM blocks is computed, the "finger" signal cancels out to get a Delta equal to:

$$\vec{\Delta} = \vec{B}^{(i)} - \vec{A}^{(j)} = \vec{t}^{(i)} - \vec{s}^{(j)} - (\vec{\bar{B}} - \vec{\bar{A}}) + \gamma \vec{W} = (\vec{\bar{A}} - \vec{\bar{B}}) + \gamma \vec{W}$$

The noise does not cancel out because there are 2 different noise realizations in the 2 blocks, but the difference of the 2 noise realizations is still in the same vector space, i.e. still proportional to W, so Delta can be added to any other transmitter and a noise reduction algorithm would perform just the same.

Adding Delta to all the rows of the second CDM block B (to shift the entire block) results in:

$$\vec{B}^{(k)} + \vec{\Delta} = \vec{t}^{(k)} - \vec{\bar{A}} + \delta \vec{W}$$

By inspection, comparing with block A, after noise removal there will be only one common vector A to be determined for both blocks, i.e. one value per receiver for the entire frame (and no longer per CDM block), which is an easier problem to solve and also allows the use of more powerful algorithms.

Following is an example of Matlab® code for stitching, according to an embodiment:

```
clear all;
% assuming CDM5 with 2 CDM blocks overlapping in 1 row
CDM=[0 -1 1 -1 1; -1 0 1 1 -1; 1 1 0 -1 -1; -1 1 -1 0 1; 1 -1 -1 1 0];
order=5;
assert(all(all(CDM*CDM'+ones(order)order*eye(order))))
w=1+(1:10)/10; % noise weights
sigma=10;
rng(1)
% physical background capacitance
base1=10*rand(5,10);
base2=10*rand(5,10);
base2(1,:)=base1(5,:); % same signal
```

```
r=sigma*(randn(5,1));
tempt=base1+r*w; % display noise realization
r=sigma*(randn(5,1));
temp2=base2+r*w; % display noise realization
a=(CDM'/order)*CDM*temp1+2048; % zero row sum removes the mean
b=(CDM'/order)*CDM*temp2+2048; % zero row sum removes the mean
% force matching: last transmitter of CDM block A and first transmitter of CDM block B (which is the same transmitter)
db=a(5,:)-b(1,:); % difference
dB=1*repmat(db,5,1);
bp=b+dB; % apply the difference to entire block B
base=[a; bp(2:end,:)]; % recombine, and generate the first frame to be passed to IFP
r=sigma*(randn(5,1));
temp1=base1+r*w; % new display noise realization
r=sigma*(randn(5,1));
temp2=base2+r*w; % new display noise realization
injectedDelta=10*(rand(7,7)-0.5);
temp1(2:5,3:9)=temp1(2:5,3:9)+injectedDelta(1:4,:);
a=(CDM'/order)*CDM*temp1+2048; % zero row sum removes the mean
temp2(1:4,3:9)=temp2(1:4,3:9)+injectedDelta(4:7,:);
b=(CDM'/order)*CDM*temp2+2048; % zero row sum removes the mean
% force matching: last transmitter of CDM block A and first transmitter of CDM block B (which is the same transmitter)
db=a(5,:)-b(1,:); % difference
dB=1*repmat(db,5,1);
bp=b+dB; % apply the difference to entire block B
raw=[a; bp(2:end,:)]; % recombine, and generate the second frame to be passed to IFP
%%% HERE STARTS IFP (IT RECEIVES REGULAR FRAMES)
delta=raw-base; % compute delta image
W=repmat(w,9,1); % remove display noise, assumes first (left) transmitter is untouched
deltaNew=delta./W;
col=repmat(deltaNew(:,1),1,10);
deltaNew=(deltaNew-col).*W
row=repmat(deltaNew(1,:),9,1); % fix minima, assumes first (top) receiver is untouched
deltaNew=(deltaNew-row)
verify correction
error=deltaNew(2:8,3:9)-injectedDelta
assert(all(all(error<1e-8)))
```

In certain embodiments, it may be desirable to operate an input device to sense with a reduced set of sensing elements receivers, e.g., to reduce cost. For example, it may be desirable to sense with a first subset of a full set of receivers at one sensing iteration, and then sense with the remaining subset of receivers at one or more subsequent sensing iterations. In such a multiplexed sensing scheme, data acquired by the disjoint sensing blocks (e.g., receiver subsets) may be used to form a single image. As an example, for a 12 receiver electrode input device, transmitter electrodes may be activated and in a first sensing iteration, receiver electrodes 1-6 may be activated and in a second sensing iteration, receiver electrodes 7-12 may be activated. The images from the two sensing iterations may be combined to form a full image. However, such multiplexed sensing may have drawbacks in the presence of noise. For example, if common mode noise is introduced in the data (by the display, for example) it will have different realizations in different sensing iterations (muxes), making the noise difficult to remove since more free parameters need to be determined and fewer electrodes are present in each of the sensing iteration (muxes) to distinguish signal from noise. Different sensing blocks are normally disjoint, and since there may be a different noise realization in the collected data for each block, the data from each sensing iteration (mux) needs to be cleaned separately, which can be challenging due to the reduced number of electrodes in each block, which reduces the ability to distinguish noise from signal (e.g., finger touch).

According to certain embodiments, as will be described in more detail below, one or more overlapping electrodes are used during each of the sensing iterations (muxes) to transform the "muxed" data into "non-muxed" data also in the presence of common mode noise. Overlapping the receiver blocks so that they share one or more sensing elements or receiver electrodes, and performing a stitching procedure, advantageously takes care of the differential noise problem at minimal cost. This advantageously removes the problem at the root and allows the use of algorithms developed for non-multiplexed sensors. The embodiments herein are useful for various sensing schemes, including 1-dimensional absolute sensing and 2-dimensional transcapacitive sensing schemes.

In an embodiment, a method of operating an input device having a plurality of receivers and a plurality of transmitters in a multiplexed manner may include receiving, at a sensing region of the input device, an input, and driving the plurality of transmitters. Driving the transmitters may include one of applying a voltage potential or a current to the transmitters. As the transmitters are driven, the method further includes obtaining measurement signals over two or more receiver firing steps or sensing iterations, wherein for each firing step or sensing iteration a subset of the full set of receivers are used or activated and wherein each subset of receivers includes at least one receiver in common with a prior subset. For example, in a first firing step, first measurement signals corresponding to the input may be obtained using a first subset of the plurality of receivers of the input device, and thereafter during a second firing step, second measurement signals corresponding to the input may be obtained using a second subset of the plurality of receivers of the input device, wherein the second subset includes at least one receiver in common with the first subset. A difference between the first measurement signals and the second measurement signals corresponding to the at least one receiver in common may be determined, and one of the first measurement signals or the second measurement signals may be adjusted based on the determined difference to produce noise-corrected measurement signals. In certain aspects, during each firing step, the plurality of receivers used or activated for that step are used or activated simultaneously.

Figure 11:
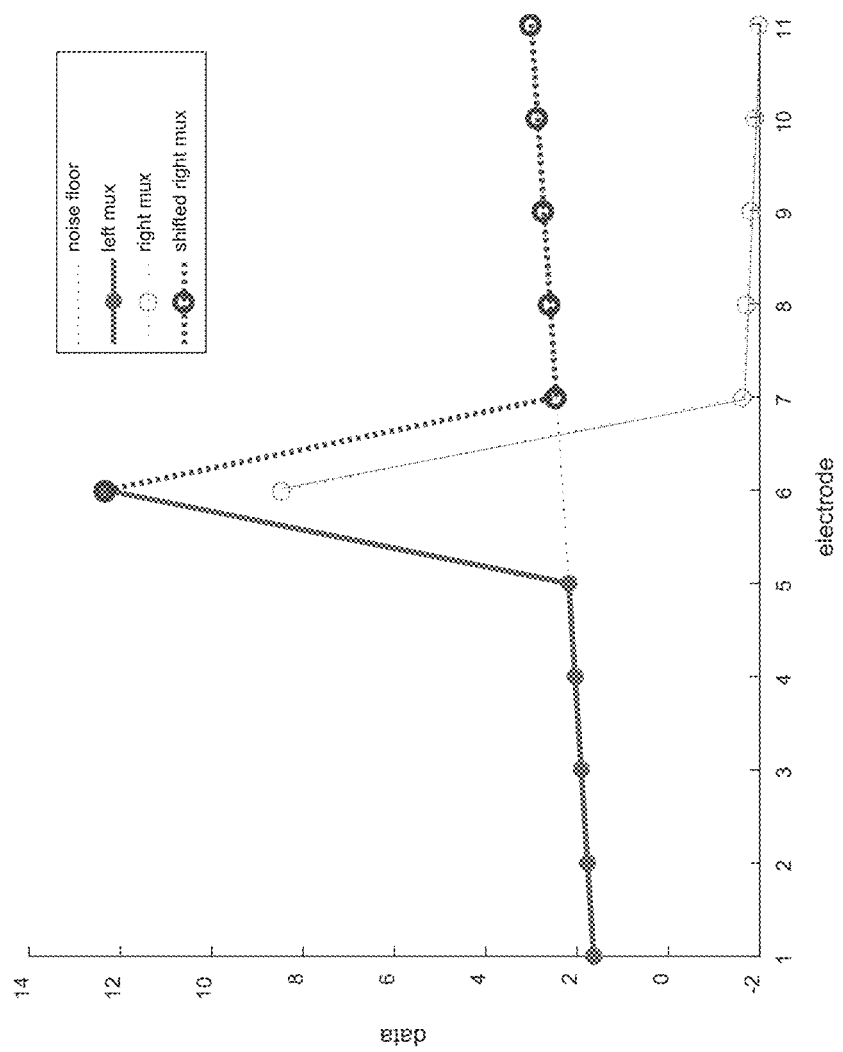
FIG. 11 shows data acquired in two receiver firing steps with an overlapping electrode, and results of a stitching procedure to correct for a noise difference between the steps, according to an embodiment.

FIG. 11 shows an example of data acquired in two receiver firing steps or sensing iterations with one overlapping receiver electrode for a set of 11 receiver electrodes, according to an embodiment. In a first sensing iteration, receiver electrodes 1-6 are activated to obtain a first set of measurement signals ("left mux" in FIG. 11), and in a second sensing iteration receiver electrodes 6-11 are activated to obtain a second set of measurement signals ("right mux" in FIG. 11), with receiver electrode 6 in common between the sensing iterations. As can be seen in this example, in the presence of noise, a difference in timing between the first sensing iteration and the second sensing iteration may result in a noise difference component (e.g., noise may change over time) detected in the measurements, as is evidenced by the difference in values for the common receiver, e.g., electrode 6. In an embodiment, the difference of the value for the common receiver between iterations may be used to determine an amount to shift the first set of measurement signals, or the second set of measurement signals, to remove the noise difference component between sensing iterations.

In an embodiment, a process for determining the noise difference component and correcting a set of measurements for two measurement iteration may be done according to the following:

$$d_i^{(1)} = s_i^{(1)} + \alpha W_i \text{ for } i=1 \text{ to } N^{(1)}$$

$$d_i^{(2)} = s_i^{(2)} + \beta W_i \text{ for } i=N^{(2)} \text{ to } N$$

where d is the measured data, s the "finger" signal, $\alpha$ and $\beta$ are normally distributed random variables representing a noise instantiation, W are the noise weights that represent the common mode noise amplitude per receiver, i is the electrode number, $N^{(1)}$ is the number of electrodes in measurement iteration (mux) 1, $N-N^{(2)}$ is the number of electrodes in mux 2, and N is the total number of electrodes.

Normally $N^{(2)} = N^{(1)} + 1$, but here $N^{(2)} \leq N^{(1)}$ instead. Also, assuming that there is one electrode in common, i.e. $N^{(2)} = N^{(1)} = k$, one can then define:

$$\Delta_k = \frac{d_k^{(1)} - d_k^{(2)}}{W_k} = \frac{s_k^{(1)} - s_k^{(2)} + (\alpha - \beta)W_k}{W_k} = (\alpha - \beta)$$

assuming the finger signal cancels out. Now $A_k$ is added to all pixels of the second mux to get:

$$d_i^{(2)} = s_i^{(2)} + \beta W_i + \Delta_k W_i = s_i^{(2)} + \alpha W_i \text{ for } i=N^{(2)} \text{ to } N$$

which reduces the problem to the original non-muxing common mode noise removal problem because $d_i = s_i + \alpha W_i$ for i=1 to N, i.e. there is only 1 parameter, $\alpha$, to be determined.

FIG. 11 also shows results of a stitching or shifting procedure to correct for a noise difference between the sensing steps, according to an embodiment. As shown, the data for electrodes $i=N^{(2)}$ to N=electrodes 6 to 11 are shifted to correct for the noise difference ("shifted right mux" in FIG. 11).

If there is more than one electrode in common and only 1 noise component, one can compute multiple $\Delta$s and take an average. Also, if the noise has multiple components, and the components are not linearly dependent on the shared electrodes, a "multiple-component" stitching may be performed.

Figure 12:
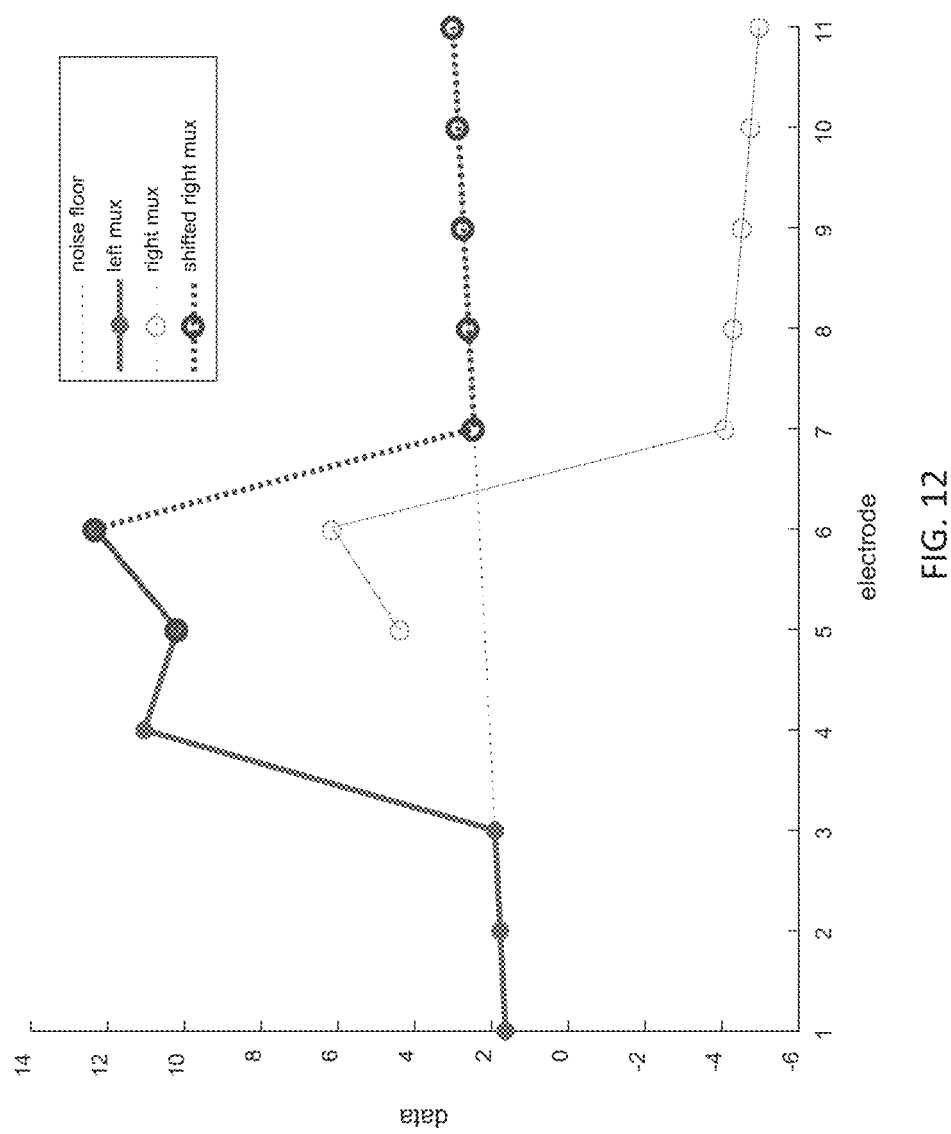
FIG. 12 shows data acquired in two receiver firing steps with two overlapping electrodes, and results of a stitching procedure to correct for a noise difference between the firing steps, according to an embodiment.

FIG. 12 shows an example of data acquired in two receiver firing steps or sensing iterations with two overlapping receiver electrodes for a set of 11 receiver electrodes, according to an embodiment. In a first sensing iteration, receiver electrodes 1-6 are activated to obtain a first set of measurement signals ("left mux" in FIG. 12), and in a second sensing iteration receiver electrodes 5-11 are activated to obtain a second set of measurement signals ("right mux" in FIG. 12), with receiver electrodes 5 and 6 in common between sensing iterations. As can be seen in this example, in the presence of noise, the difference in timing between the first sensing iteration and the second sensing iteration may result in a noise difference component (e.g., noise may change over time), as is evidenced by the difference in values for the common receivers, e.g., receiver electrodes 5 and 6. In an embodiment, the difference in value for the common receivers may be used to determine an amount to shift the first set of measurement signals, or the second set of measurement signals, to remove the noise difference between sensing iterations. FIG. 12 also shows results of a stitching or shifting procedure to correct for a noise difference between the sensing iterations with two receiver electrodes in common, according to an embodiment. As shown, the data for receiver electrodes 5 to 11 are shifted to correct for the noise difference ("shifted right mux" in FIG. 12).

Figure 13:
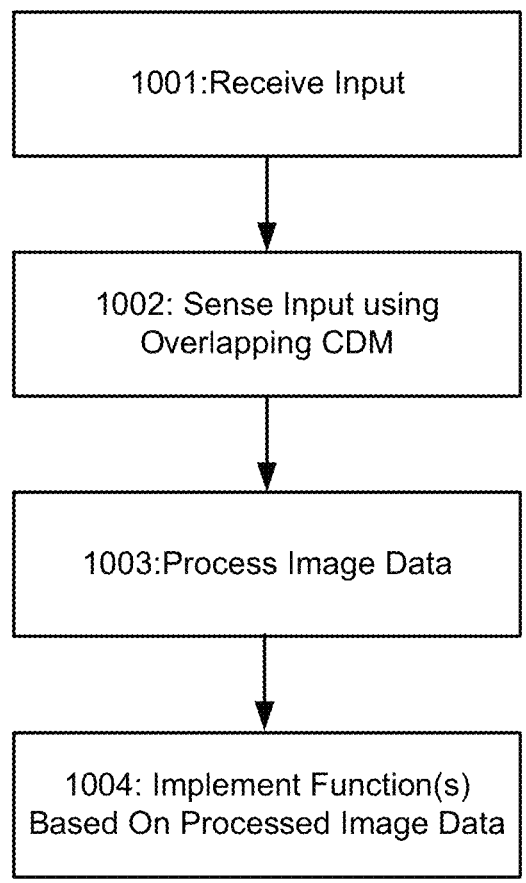
FIG. 13 is a flowchart depicting a process using lower-order zero row sum CDM according to an embodiment.

FIG. 13 is a flowchart depicting an example process for sensing an input with an input device using CDM, according to an embodiment. At stage 1001, an input, such as a biometric object or objects (e.g., one or more fingers) or a stylus, is received at a sensing region of the input device. At stage 1002, imaging is performed by the input device using CDM, for example, using a CDM drive matrix including constituent CDM blocks overlapping at one or more transmitters as described herein. The performed imaging may include, for example, a processing system deconvolving or decoding raw information obtained using the CDM techniques. At stage 1003, the detected image may be optionally processed further, if appropriate, for example using IFP techniques. At stage 1004, various functions (such as touch sensing, navigation functions, authentication, etc.) may be performed by the processing system based on the detected and/or processed image.

The various embodiments herein are useful for square wave sensing, sine wave sensing or any sensing modulation/shaping pattern.

It will be appreciated that although the illustrative examples discussed above are provided in the context of capacitive input devices, the principles described herein may also be applied to other types of input devices, such as acoustic or ultrasonic input devices, which also utilize transmitters and receivers. For example, the transmitters of an acoustic or ultrasonic input device may also be driven over multiple iterations using a lower-order overlapping CDM techniques as described herein.

U.S. patent application Ser. No. 15/720,817, filed Sep. 29, 2017, and U.S. patent application Ser. No. 16/132,773, filed Sep. 17, 2018, which are incorporated herein by reference, discloses various aspects of input sensing using CDM drive matrices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of input sensing using an input device, the method comprising:
   receiving, at a sensing region of the input device, one or more inputs; and
   obtaining, using a plurality of receivers of the input device, measurement signals corresponding to the one or more inputs, wherein obtaining the measurement signals comprises:
      driving a first subset of transmitters of the input device according to multiple drive iterations of a first sub-matrix of a CDM drive matrix, wherein the CDM matrix is a zero row sum matrix, and obtaining first measurement signals with the plurality of receivers; and
      driving a second subset of the transmitters according to multiple drive iterations of a second sub-matrix of the CDM drive matrix, wherein the first subset of transmitters driven according to the multiple drive iterations of the first submatrix and the second subset of transmitters driven according to the multiple drive iterations of the second submatrix include different transmitters and at least one transmitter in common, and obtaining second measurement signals with the plurality of receivers.

2. The method of claim 1, wherein each of the first and second subsets of transmitters comprises a plurality of non-contiguous transmitters.

3. The method of claim 2, wherein at least one of the first and second subsets of transmitters includes at least two contiguous transmitters.

4. The method of claim 1, wherein the zero row sum CDM drive matrix has an odd dimension or the zero row sum CDM drive matrix has an even dimension or the zero row sum CDM drive matrix includes a circulant matrix.

5. The method of claim 1, wherein the plurality of receivers comprises a subset of all the receivers of the input device.

6. The method according to claim 1, further comprising generating, by a processing system, an image of the one or more inputs based on the obtained first and second measurement signals, wherein the generating the image includes decoding the obtained first and second measurement signals using the inverse or transpose of the corresponding first or second sub-matrix of the CDM drive matrix for the first and second driven subsets of transmitters to obtain image information.

7. The method of claim 1, wherein the input device includes a transcapacitive input device and wherein the transmitters are transmitter electrodes, and the receivers are receiver electrodes.

8. The method of claim 1, wherein the first and second subsets of transmitters include more than one transmitter in common.

9. The method of claim 1, wherein the obtaining measurement signals further includes driving a third subset of the transmitters according to the CDM drive matrix, wherein the third subset of transmitters includes at least one transmitter in common with the first subset of transmitters or the second subset of transmitters, and obtaining third measurement signals with the plurality of receivers.

10. An input device for sensing a biometric object, the input device comprising:
    a surface corresponding to a sensing region, wherein the sensing region is configured to receive one or more inputs;
    transmitters, configured to be driven with transmitter signals; and
    receivers, configured to obtain measurement signals corresponding to the one or more inputs, by: driving a first subset of the transmitters according to multiple drive iterations of a first sub-matrix of a CDM drive matrix, wherein the CDM matrix is a zero row sum matrix, and obtaining first measurement signals with the receivers, and thereafter driving a second subset of the transmitters according to multiple drive iterations of a second sub-matrix of the CDM drive matrix, wherein the first subset of transmitters driven according to the multiple drive iterations of the first submatrix and the second subset of transmitters driven according to the multiple drive iterations of the second submatrix include different transmitters and at least one transmitter in common, and obtaining second measurement signals with the receivers.

11. The input device of claim 10, wherein each of the first and second subsets of the transmitters comprises a plurality of non-contiguous transmitters.

12. The input device of claim 11, wherein at least one of the first and second subsets of the transmitters includes at least two contiguous transmitters.

13. The input device of claim 10, further comprising a processing system configured to generate an image of the one or more inputs based on the obtained first and second measurement signals by decoding the obtained first and second measurement signals using the inverse or transpose of the corresponding first or second sub-matrix of the CDM drive matrix for the first and second driven subsets of transmitters to obtain image information.

14. The input device of claim 10, wherein the input device is a transcapacitive input device, the transmitters are transmitter electrodes, and the receivers are receiver electrodes.

15. The input device of claim 10, wherein the zero row sum CDM drive matrix has an odd dimension or the zero row sum CDM drive matrix has an even dimension or the zero row sum CDM drive matrix includes a circulant matrix.

16. The input device of claim 10, wherein the first and second subsets of the transmitters include more than one transmitter in common.

17. A non-transitory computer-readable medium having processor-executable instructions stored thereon for performing input sensing using an input device, the processor-executable instructions, when executed by a processing system, enable the processing system to implement the following method:
  obtaining, via receivers of the input device, measurement signals corresponding to one or more inputs received at a sensing region of the input device, wherein obtaining the measurement signals comprises: driving a first subset of transmitters of the input device according to multiple drive iterations of a first sub-matrix of a CDM drive matrix, wherein the CDM matrix is a zero row sum matrix, and obtaining first measurement signals with the receivers, and driving a second subset of the transmitters according to multiple drive iterations of a second sub-matrix of the CDM drive matrix, wherein the first subset of transmitters driven according to the multiple drive iterations of the first submatrix and the second subset of transmitters driven according to the multiple drive iterations of the second submatrix include different transmitters and at least one transmitter in common, and obtaining second measurement signals with the receivers; and
  generating an image of the one or more inputs by processing the first measurement signals and the second measurement signals.

18. The non-transitory computer-readable medium of claim 17, wherein the generating the image includes decoding the obtained first and second measurement signals using the inverse or transpose of the corresponding first or second sub-matrix of the CDM drive matrix for the first and second driven subsets of transmitters to obtain image information.

19. The non-transitory computer-readable medium of claim 17, wherein the input device is a transcapacitive input device, the transmitters are transmitter electrodes, and the receivers are receiver electrodes.

* * * * *